(12) United States Patent
Jo

(10) Patent No.: US 9,852,669 B2
(45) Date of Patent: Dec. 26, 2017

(54) OUTDOOR ADVERTISEMENT STRUCTURE ON BUS ROOF

(71) Applicant: JG Industry Co., Ltd., Jongno-gu, Seoul (KR)

(72) Inventor: Jae-Man Jo, Seoul (KR)

(73) Assignee: JG Industry Co., Ltd., Jongno-gu, Seoul (KR)

( * ) Notice: Subject to any disclaimer, the term of this patent is extended or adjusted under 35 U.S.C. 154(b) by 0 days.

(21) Appl. No.: 15/034,520

(22) PCT Filed: Nov. 6, 2014

(86) PCT No.: PCT/KR2014/010612
§ 371 (c)(1),
(2) Date: May 4, 2016

(87) PCT Pub. No.: WO2015/069036
PCT Pub. Date: May 14, 2015

(65) Prior Publication Data
US 2016/0300515 A1    Oct. 13, 2016

(30) Foreign Application Priority Data
Nov. 8, 2013  (KR) ........................ 10-2013-0135462

(51) Int. Cl.
*G06F 21/04*    (2006.01)
*G09F 21/04*    (2006.01)
(Continued)

(52) U.S. Cl.
CPC .............. *G09F 21/04* (2013.01); *B60R 13/00* (2013.01); *B62D 25/06* (2013.01); *G09F 13/00* (2013.01);
(Continued)

(58) Field of Classification Search
CPC ........ G09F 21/04; G09F 21/048; B60R 13/00
See application file for complete search history.

(56) References Cited

U.S. PATENT DOCUMENTS 1,511,814 A * 10/1924 Lewis ..................... G09F 21/04
198/687
1,752,591 A * 4/1930 Ellis ........................ B60R 13/00
40/592
(Continued)

FOREIGN PATENT DOCUMENTS

| CN | 2310360 Y | 3/1999 |
|---|---|---|
| WO | 2005/093699 A1 | 10/2005 |
| WO | 2008/157618 A2 | 12/2008 |

OTHER PUBLICATIONS

"Cars on the Wind—Cars and Air Resistance," Hyundai Mobis Blog, Aug. 17, 2012, <http://hyundaimobis.tistory.com/172> [retrieved May 6, 2016], 30 pages.

(Continued)

*Primary Examiner* — Gary C Hoge
(74) *Attorney, Agent, or Firm* — Christensen O'Connor Johnson Kindness PLLC

(57) ABSTRACT

An outdoor advertisement structure on a bus roof of the present invention can hide the untidiness of a heating, ventilation and air conditioning (HVAC) system and the like mounted on the bus roof by a rectangular-shaped advertisement structure (10) since the advertisement structure (10) of which upper and lower parts are open and the four surrounding surfaces thereof are connected, is mounted on a bus roof (1) to cover an HVAC system (3) mounted on the bus roof (1) such that the HVAC system (3) is not exposed to the outside and to simultaneously provide a mounting area for traffic information notification and advertisements, wherein a front light guide panel (20) and a side light guide panel (22) for traffic information notification and advertisement (Continued)

are respectively mounted on a front part (12) and both side parts (14) of the advertisement structure (10), and thereby providing a balance between the bus and a cityscape by finishing the exterior appearance state of the bus roof (1) to be relatively aesthetically pleasing, increasing the advertising efficiency by minimizing advertisements hidden by nearby vehicles or road facilities, enabling the advertisements to be easily identified with the naked eye regardless of the time of day and focusing the attention of consumers at a new advertising height, and maximizing advertising effects by attaching large advertisements of advertising text, photographs and the like onto an upper plate material (30) covering the upper opening of the advertisement structure (10).

17 Claims, 6 Drawing Sheets

(51) Int. Cl.
  *B60R 13/00* (2006.01)
  *G09F 13/00* (2006.01)
  *B62D 25/06* (2006.01)
  *G09F 13/04* (2006.01)

(52) U.S. Cl.
  CPC ...... *G09F 21/048* (2013.01); *G09F 2013/044* (2013.01)

(56) References Cited

U.S. PATENT DOCUMENTS

| | | | | |
|---|---|---|---|---|
| 3,152,416 A * | 10/1964 | MacLean | ................ | G09F 21/04 224/317 |
| 3,440,748 A * | 4/1969 | Hackley | ................... | G09F 7/04 224/318 |
| 4,475,299 A * | 10/1984 | Nelson | ...................... | F16B 5/00 40/591 |
| 4,688,343 A * | 8/1987 | Allan | ................... | G07B 13/045 40/591 |
| 2004/0103571 A1* | 6/2004 | Smith | ...................... | G09F 21/04 40/591 |
| 2005/0001433 A1* | 1/2005 | Seelin | ....................... | G09F 9/33 290/44 |
| 2005/0224543 A1 | 10/2005 | Cope | | |
| 2009/0234740 A1* | 9/2009 | Jabbari | .................. | G06Q 30/02 705/14.62 |
| 2011/0249204 A1* | 10/2011 | Hamilton | ................ | G09F 21/04 348/837 |
| 2013/0074383 A1* | 3/2013 | Hagemann | ............ | G09F 13/005 40/447 |
| 2013/0231828 A1* | 9/2013 | Seal | ........................ | G09F 19/18 701/36 |
| 2014/0267975 A1* | 9/2014 | Ying | ........................ | G09F 9/33 349/58 |
| 2014/0304080 A1* | 10/2014 | Yilmaz | ................... | G09F 21/04 705/14.63 |
| 2014/0338237 A1* | 11/2014 | Chu | ......................... | G09F 9/30 40/452 |
| 2015/0070155 A1* | 3/2015 | Reich | ....................... | G09F 9/33 340/425.5 |

OTHER PUBLICATIONS

Creativematch, "CBS Outdoor and First UK Bus Launches First Single Deck Superside Bus Format in UK Mainland," Oct. 23, 2009, Creative Social Business Network, Andover, UK, <http://www.creativematch.com/news/cbs-outdoor-and-first-uk/97879> [retrieved May 6, 2016], 3 pages.

International Search Report dated Feb. 17, 2015, issued in corresponding International Application No. PCT/KR2014/010612, filed Nov. 6, 2014, 5 pages.

\* cited by examiner

OUTDOOR ADVERTISEMENT STRUCTURE ON BUS ROOF

TECHNICAL FIELD

The present invention relates to an outdoor advertisement structure installed on the roof of a bus, which is a public transportation means, and more particularly, to an outdoor advertisement structure on a bus roof, which can further increase the efficiency of advertisement by constructing a region for transportation information notification for guiding a bus route, a starting terminal, an arrival terminal, intermediate stops and the like or an advertising material for advertising an enterprise, a public campaign or the like at a new height of sight.

BACKGROUND ART

Generally, a bus is a public transportation means always traveling a predetermined route so that a lot of people may conveniently ride the bus.

Advertisement sheets having advertisement phrases printed thereon are attached inside the bus or the advertisement sheets are attached on the outside of the bus, so that passengers riding the bus or people passing through the vicinity of a road on which the bus travels may confirm the contents of the advertisement.

However, since advertising materials such as advertisement phrases, and pictures attached on the outside of the bus, among the conventional advertisement means as described above, are generally configured in a structure to be printed and attached on both lateral faces of the bus, under the glass windows of the bus, in the form of a sheet or inserted in and supported by a supporting frame formed like a picture frame, there is a problem in that when the advertising materials coexist with the surrounding vehicles or road facilities, most of the advertising materials positioned at a lower portion on both lateral faces of the bus are hidden and difficult to be identified with naked eyes. Particularly, since they are more difficult to identified and cannot attract attention of consumers at night when illuminance is low, the efficiency of advertisement is lowered considerably.

DISCLOSURE

Technical Problem

The present invention is conceived to solve the aforementioned problems in the prior art. An object of the present invention is to provide an outdoor advertisement structure on a bus roof, which can enhance the efficiency of advertisement by installing an advertisement structure of a rectangular shape on the bus roof, in which the bus roof is a new height of sight that the advertising materials are not easily hidden by the surrounding vehicles or road facilities, so that the advertisement structure can be easily identified with naked eyes regardless of day and night and concentrate attention of consumers.

Another object of the present invention is to provide an outdoor advertisement structure on a bus roof, which can further enhance the efficiency of notification and advertisement for each region by installing transportation information notification and advertising panels based on illumination lights to be distributed on the front face and both the lateral faces of an advertisement structure installed on the roof of a bus, respectively, and attaching a large advertising material such as an advertisement phrase, or a picture on the upper face.

Technical Solution

According to an embodiment of the present invention for achieving the objects, there is provided an outdoor advertisement structure on a bus roof including an advertisement structure having a rectangular shape with open upper and lower portions and four connected lateral faces and installed on a bus roof to cover a heating, ventilation and air conditioning (HVAC) system mounted on the bus roof so that the HVAC system is not exposed to the outside and to provide an installation area for transportation information notification and advertising materials; and a front light guide panel and lateral light guide panels for transportation information notification and advertising materials installed on a front portion and both lateral portions of the advertisement structure, respectively.

In another embodiment, the advertisement structure is configured to have a height in a range of 80 to 170 cm to be greater than a height of the HVAC system mounted on the bus roof.

In another embodiment, the front portion and both the lateral portions of the advertisement structure are configured to be inclined inwardly at a predetermined angle ($\alpha$) as it moves from the lower portion to the upper portion to minimize air resistance.

In another embodiment, the advertisement structure has an installation hole formed on the front portion to install the front light guide panel, a plurality of installation holes formed on both the lateral portions to install the lateral light guide panels, and a plurality of penetration holes formed on a rear portion to discharge air and rainwater.

In another embodiment, the plurality of installation holes are configured to be fore-and-aft symmetrical in a rectangular shape having a horizontal width greater than a vertical width.

In another embodiment, a front blade gradually inclined downward as it moves to a rear side while being horizontally bent toward the rear side is formed on an upper end of the front portion to smoothly induce air flow into the advertisement structure, and a rear blade gradually lowered as it moves to a front side while being horizontally bent toward the front side is formed on an upper end of the rear portion to easily discharge the air inside the advertisement structure.

In another embodiment, contact face portions (12c, 14c and 16c) bent inwardly at a right angle are respectively formed at lower ends of the front portion, both the lateral portions and the rear portion to be easily in close contact with an edge of the bus roof and fixed by a plurality of fastening means.

In another embodiment, the front light guide panel and the plurality of lateral light guide panels are electrically connected to a control means to be individually or simultaneously controlled while being fixed to inner faces of the advertisement structure, respectively.

In another embodiment, a plurality of upper plates sliding forward and backward are installed in the upper opening of the advertisement structure to cover the HVAC system mounted on the bus roof so that the HVAC system is not exposed to the outside through the upper portion and to provide an installation area for attaching advertising materials.

In another embodiment, left and right ends of the plurality of upper plates are respectively coupled to rail grooves on both lateral faces of the advertisement structure to be overlapped or deployed in a sliding manner.

In another embodiment, upper faces of the plurality of upper plates are formed in a gently curved shape gradually lowered as it moves from a center to left and right sides so that rainwater may easily flow downward without being stagnated.

Advantageous Effects

Since the outdoor advertisement structure on a bus roof of the present invention is fixed to surround the edge of the bus roof, there are effects of covering untidiness of the HVAC system and the like mounted on the bus roof and harmonizing with a cityscape by further beautifully finishing the exterior state of the bus roof.

In addition, since a front light guide panel and lateral light guide panels can be supported by the advertisement structure of the present invention so as to be positioned on the uppermost end of the bus roof, there are effects of minimizing the possibility of the advertising material being hidden by the surrounding vehicles or road facilities, making it easy to identify the advertisement structure with the naked eye regardless of day and night, and enhancing the efficiency of advertisement by concentrating attention of consumers at a new advertisement height.

Further, the present invention has effects of maximizing the advertisement effect by attaching a large advertising material such as an advertising phrase, or a picture on an upper plate covering the upper opening of the advertisement structure.

Figure 1:
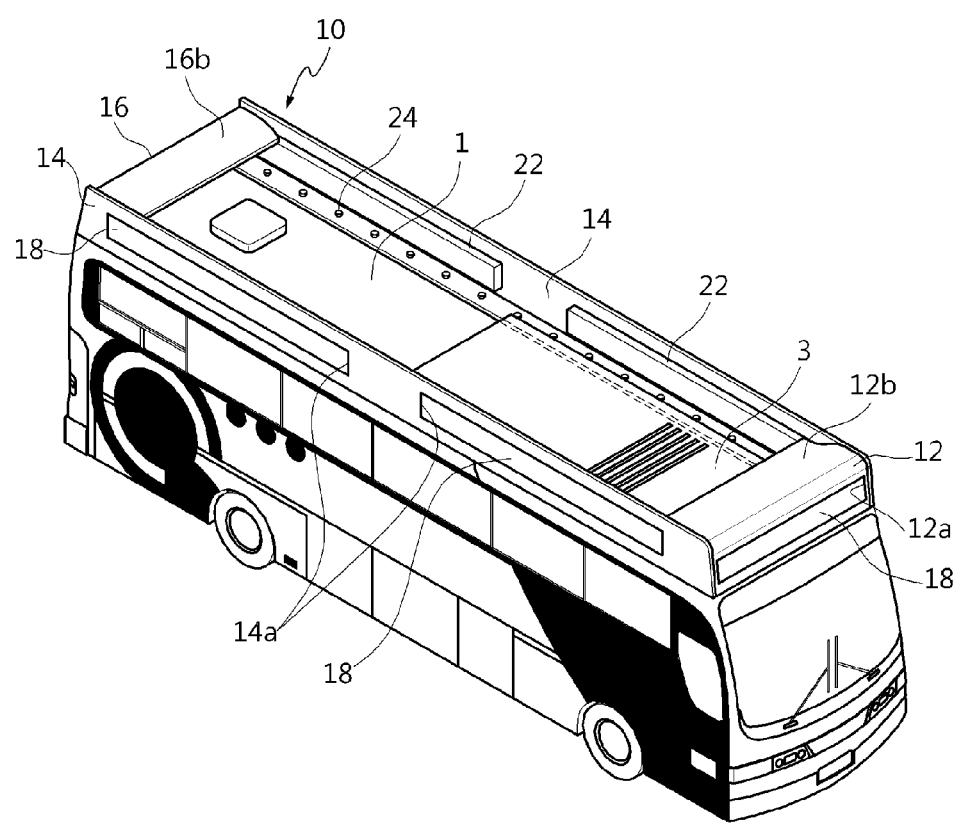
FIG. 1 is a perspective view showing an outdoor advertisement structure mounted on a bus roof according to a first embodiment of the present invention.

[Explanation of Reference Numerals for Major Portions Shown in Drawings]

| | |
|---|---|
| 1: Bus Roof | 3: HVAC system |
| 10: Advertisement Structure | 12: Front Portion |
| 12a: Installation Hole | 12b: Front Blade |
| 12c: Contact Face Portion | 14: Both Lateral Portion |
| 14a: Installation Hole | 14b: Rail Groove |
| 14c: Contact Face Portion | 16: Rear Portion |
| 16a: Penetration Hole | 16c: Contact Face Portion |
| 18: Transparent Plate | 20: Front Light Guide Panel |
| 22: Lateral Light Guide Panel | 24: Fastening Means |
| 30: Upper Plate | |

BEST MODE

Hereinafter, embodiments of the present invention will be described in detail with reference to FIGS. 1 to 6.

Figure 2:
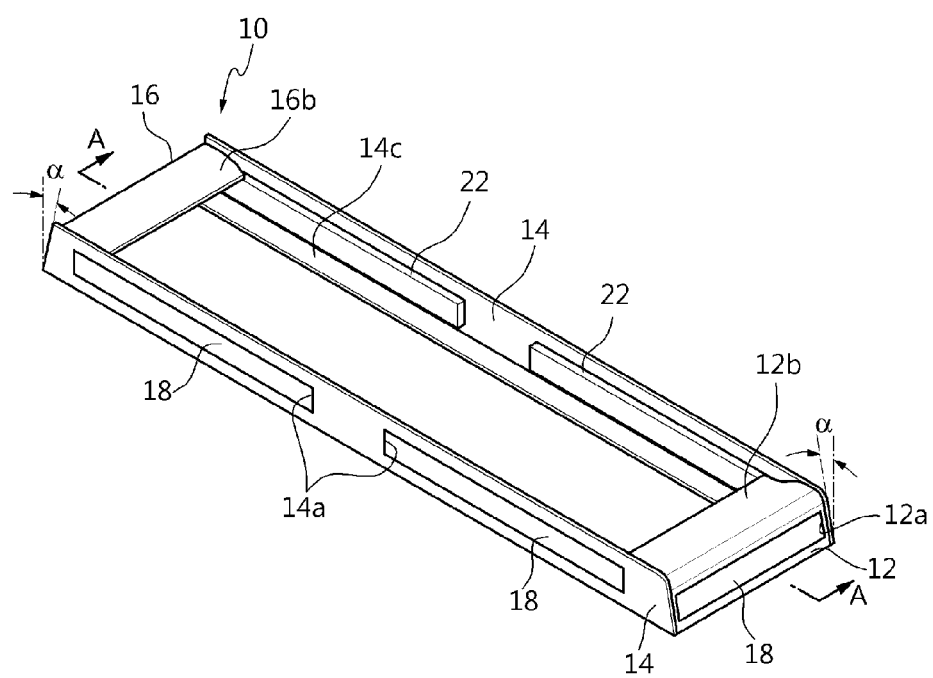
FIG. 2 is a perspective view showing the outdoor advertisement structure of FIG. 1.
Figure 3:
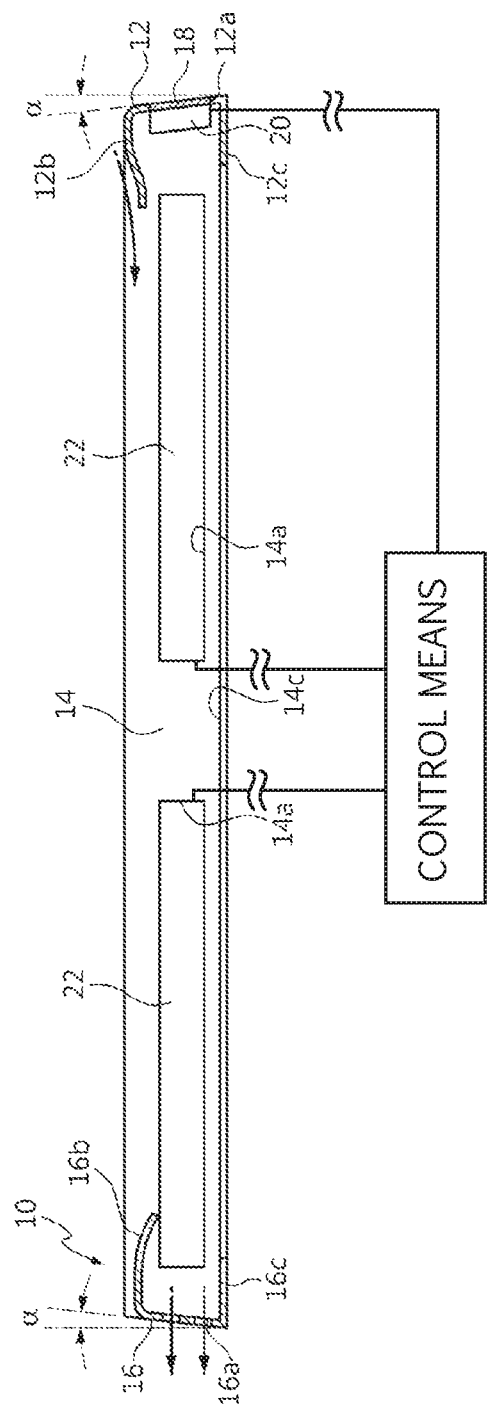
FIG. 3 shows a longitudinal sectional view taken along line A-A in FIG. 2.

As shown in FIGS. 1 to 3, an outdoor advertisement structure 10 according to a first embodiment of the present invention is manufactured in a rectangular shape having open upper and lower portions and four connected lateral faces to cover an HVAC system 3 and the like mounted on a bus roof 1 so that the HVAC system is not exposed to the outside through the front face, both the lateral faces and the rear face and to provide an installation area for transportation information notification and advertising materials, and then is fixed to the upper face of the bus roof 1.

That is, the advertisement structure 10 is formed of any one material selected from plastic, aluminum and steel which can minimize the weight and is configured to have a height in a range of 80 to 170 cm to be greater than the height of the HVAC system 3 mounted on the bus roof 1, and the front face and both the lateral faces are configured to be inclined inwardly from the lower portion to the upper portion at a predetermined angle $\alpha$ to minimize air resistance.

The advertisement structure 10 has an installation hole 12a formed on the front portion 12 to install a front light guide panel 20 for transportation information notification, advertisements and the like, a plurality of installation holes 14a formed on both the lateral portions 14 to install lateral light guide panels 22 for transportation information notification, advertisements and the like, and a plurality of penetration holes 16a formed on the rear portion 16 to easily discharge air, rainwater and the like.

At this point, the installation hole 12a on the front portion 12 is preferably configured in a rectangular shape having a horizontal width greater than a vertical width in order to maximize the installation area of the transportation information notification and advertising materials.

The plurality of installation holes 14a on both the lateral portions 14 are preferably configured to be fore-and-aft symmetrical in a rectangular shape having a horizontal width greater than a vertical width in order to maximize the installation area of the transportation information notification and advertising materials.

A transparent plate 18 such as tempered glass is attached to the installation hole 12a on the front portion 12 and the installation holes 14a on both the lateral portions 14 so as to prevent direct collision with an object in advance while exposing the front faces of the front light guide panel 20 and the lateral light guide panels 22 to the outside.

A front blade 12b gradually inclined downward as it moves to the rear side while being horizontally bent toward the rear side is formed on the upper end of the front portion 12 to smoothly induce air flow into the advertisement structure 10, and a rear blade 16b gradually lowered as it moves to the front side while being horizontally bent toward the front side is formed on the upper end of the rear portion 16 to easily discharge the air inside the advertisement structure 10.

Contact face portions 12c, 14c and 16c bent inwardly at a right angle are respectively formed at the lower ends of the front portion 12, both the lateral portions 14 and the rear portion 16 to be easily in close contact with the edge of the bus roof 1, and these contact face portions 12c, 14c and 16c are configured to be finished by applying an adhesive or a waterproofer after being fixed by fastening means 24 such as bolt and nut.

In addition, the front light guide panel 20 and the plurality of lateral light guide panels 22 are preferably configured of light emitting diodes (LEDs) to express the design of the transportation information notification and advertising materials in a phrase and a pattern of various colors, and electrically connected to a control means (not shown) so as to be individually or simultaneously controlled while being fixed to the inner faces of the front portion 12 and both the lateral portions 14, respectively.

Since the advertisement structure 10 of the present invention configured as described above rests to surround the edge of the bus roof 1 and is fixed by a plurality of fastening means 24, it may cover untidiness of the HVAC system and the like mounted on the bus roof 1 and harmonize with a cityscape by further beautifully finishing the exterior state of the bus roof 1.

In addition, since the front light guide panel 20 and the lateral light guide panels 22 for transportation information notification and advertising materials are positioned on the uppermost end of the bus roof 1 via the advertisement structure 10, it is possible to minimize the possibility of the advertising material being hidden by the surrounding vehicles or road facilities, it is easy to identify the advertisement structure with the naked eye regardless of day and night, and it is possible to enhance the efficiency of advertisement by concentrating attention of consumers at a new advertisement height.

Figure 4:
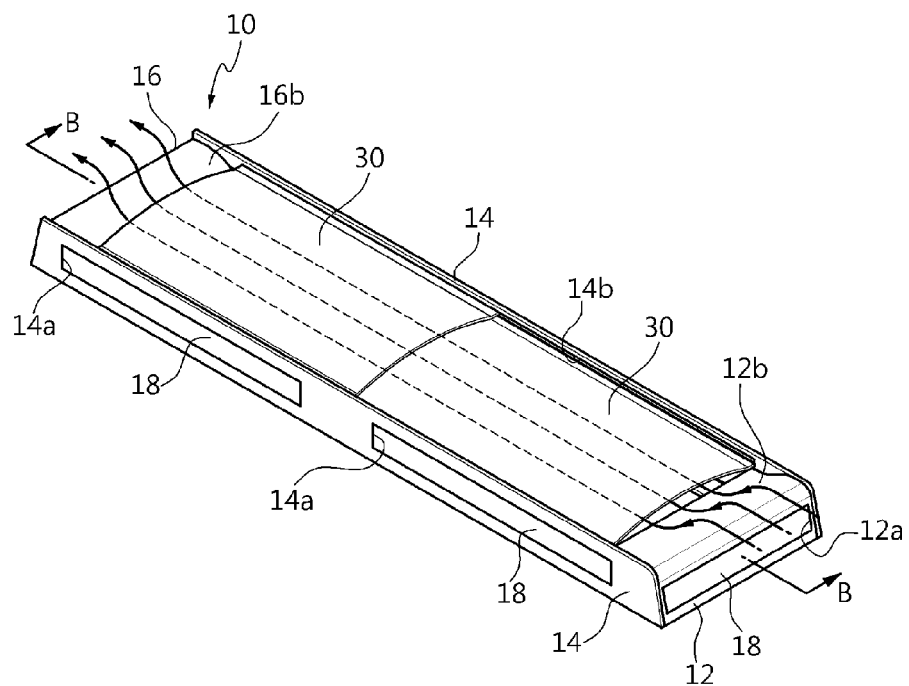
FIG. 4 is a perspective view showing an outdoor advertisement structure according to a second embodiment of the present invention.
Figure 5:
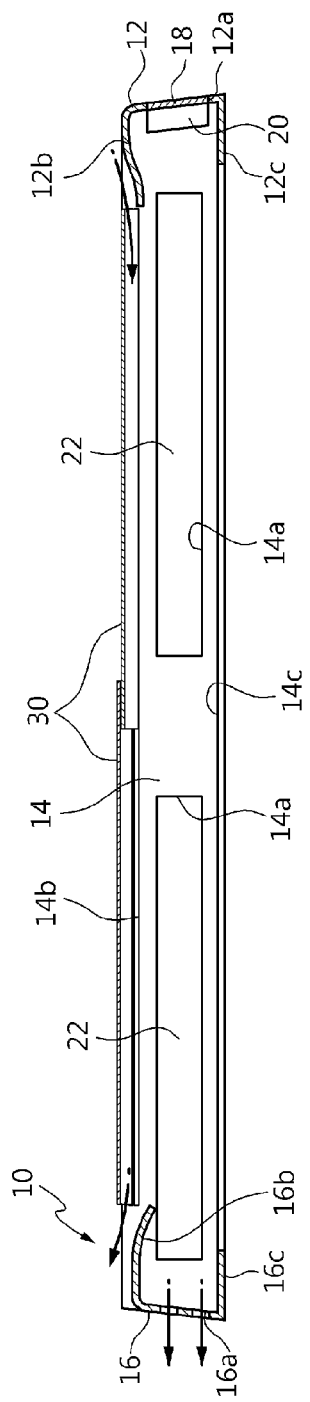
FIG. 5 shows a longitudinal sectional view taken along line B-B in FIG. 4.
Figure 6:
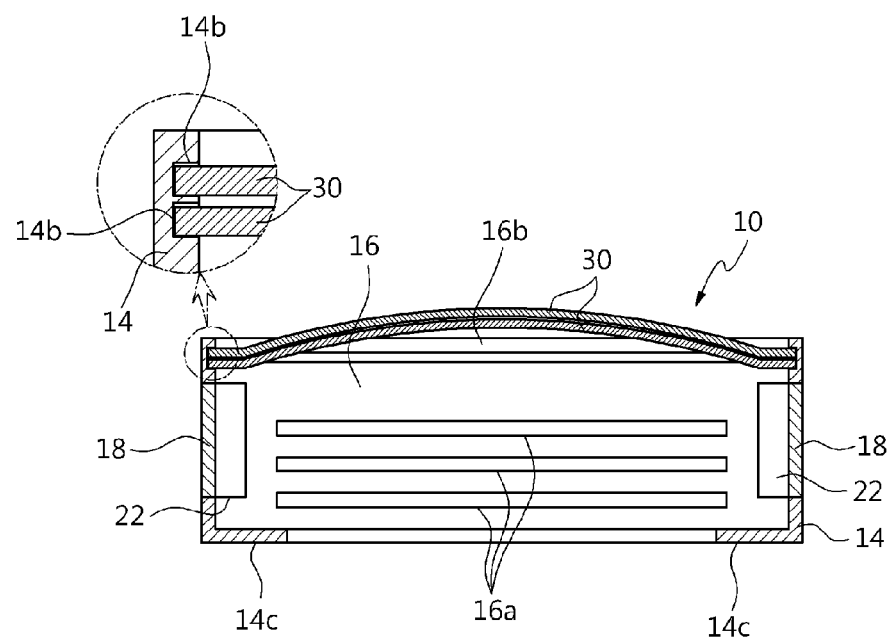
FIG. 6 shows a longitudinal sectional view taken along line C-C in FIG. 4.

Meanwhile, as shown in FIGS. 4 to 6, a plurality of upper plates 30 sliding forward and backward are installed in the upper opening of the advertisement structure 10 according to a second embodiment of the present invention to cover the HVAC system 3 and the like mounted on the bus roof 1 so that the HVAC system is not exposed to the outside through the upper portion and to provide an installation area for attaching advertising materials.

That is, the plurality of upper plates 30 cover front and rear sides, respectively, into which the upper face of the advertisement structure 10 is divided, and slide forward or backward in a sliding manner to expose the bus roof 1 to the outside by being overlapped with each other in the front or rear side, as needed.

At this point, the left and right ends of the plurality of upper plates 30 are respectively configured to be inserted into horizontal rail grooves 14b formed in two steps in inner upper ends of both the lateral portions 14 to slide forward and backward, and the upper faces of the plurality of upper plates 30 are formed in a gently curved shape gradually lowered as it moves from the center to the left and right sides so that rainwater or the like may easily flow downward without being stagnated.

In addition, the advertisement effects can be maximized by attaching a large advertising material such as an advertisement phase or a picture on the upper faces of the plurality of upper plates 30.

The upper plates 30 of the present invention configured as described above may maximize the advertisement effects by a large advertising material attached on the upper face thereof while being deployed to close the upper portion of the advertisement structure 10 in normal, and when a maintenance work is performed on the HVAC system 3, the front light guide panel 20, the lateral light guide panels 22 or the like, the upper plates 30 may slide forward or backward to be overlapped with each other to open the upper portion of the advertisement structure 10.

In addition, since the center of the end of the upper plate 30 is installed at a position higher than the ends of the front blade 12b and the rear blade 16b of the advertisement structure 10, the upper plates 30 function as a curtain blocking the sun light passing through the bus roof 1, as well as server to supply air needed for heat exchange of the HVAC system 3 on the bus roof 1 and to cool down the heat emitted from the control means of the front light guide panel 20, the lateral light guide panels 22 and the like installed inside the advertisement structure 10, as the air flowing to the bus roof 1 is discharged to the outside by way of the space formed under the upper plates 30 in the direction of the arrows shown in FIG. 4.

The present invention is not limited to the above-described embodiments but various modifications and variations can be made thereto within the scope of the invention without departing from the essential features of the invention. The modifications and variations will be considered to fall in the scope of the present invention defined by the appended claims.

The invention claimed is:

1. An outdoor advertisement structure on a bus roof, comprising:
    an advertisement structure having a rectangular shape with open upper and lower portions and four connected portions and installed on a bus roof to provide an installation area for transportation information notification and advertising materials, the four connected portions comprising a front portion and opposed lateral side portions;
    a front light guide panel and lateral light guide panels for transportation information notification and advertising materials installed on a front portion and both lateral side portions of the advertisement structure, respectively;
    a front blade gradually inclined downward as it moves to a rear side while being horizontally bent toward the rear side is formed on an upper end of the front portion to induce air flow into the advertisement structure; and
    a rear blade gradually lowered as it moves to a front side while being horizontally bent toward the front side is formed on an upper end of the rear portion to discharge the air inside the advertisement structure.

2. The outdoor advertisement structure according to claim 1, wherein the advertisement structure is installed on the bus roof to cover a heating, ventilation and air conditioning (HVAC) system mounted on the bus roof so that the HVAC system is not exposed to the outside, and the outdoor advertisement structure is configured to have a height in a range of 80 to 170 cm to be greater than a height of the HVAC system mounted on the bus roof.

3. The outdoor advertisement structure according to claim 1, wherein the front portion and both the lateral side portions of the advertisement structure are configured to be inclined inwardly at a predetermined angle as it moves from the lower portion to the upper portion to minimize air resistance.

4. The outdoor advertisement structure according to claim 1, wherein the advertisement structure has an installation hole formed on the front portion to install the front light guide panel, a plurality of installation holes formed on both the lateral side portions to install the lateral light guide panels, and a plurality of penetration holes formed on a rear portion to discharge air and rainwater.

5. The outdoor advertisement structure according to claim 4, wherein the plurality of installation holes are configured to be fore-and-aft symmetrical in a rectangular shape having a horizontal width greater than a vertical width.

6. The outdoor advertisement structure according to claim 1, wherein contact face portions bent inwardly at a right angle are respectively formed at lower ends of the front portion, both the lateral portions and the rear portion to be easily in close contact with an edge of the bus roof and fixed by a plurality of fastening means.

7. The outdoor advertisement structure according to claim 1, wherein the front light guide panel and the plurality of lateral light guide panels are electrically connected to a control means to be individually or simultaneously controlled while being fixed to inner faces of the advertisement structure, respectively.

8. An outdoor advertisement structure on a bus roof, the bus having equipment mounted on the bus roof to extend above the bus roof, comprising:
   an advertisement structure having a rectangular shape with open upper and lower portions and four connected portions and installed on a bus roof to provide an installation area for transportation information notification and advertising materials, the four connected portions comprising a front portion and opposed lateral side portions;
   a front light guide panel and lateral light guide panels for transportation information notification and advertising materials installed on a front portion and both lateral side portions of the advertisement structure, respectively; and
   wherein a plurality of upper plates sliding forward and backward are installed in the upper opening of the advertisement structure to cover the equipment mounted on the bus roof so that the equipment is not exposed to the outside through the upper portion and to provide an installation area for attaching advertising materials.

9. The outdoor advertisement structure according to claim 8, wherein left and right ends of the plurality of upper plates are respectively coupled to rail grooves on both lateral side portions of the advertisement structure to be overlapped or deployed in a sliding manner.

10. The outdoor advertisement structure according to claim 8, wherein upper faces of the plurality of upper plates are formed in a gently curved shape gradually lowered as it moves from a center to left and right sides so that rainwater may easily flow downward without being stagnated.

11. An outdoor advertisement structure on a bus roof, the bus having equipment mounted on the bus roof to extend above the bus roof, comprising:
   an advertisement structure having a rectangular shape with open upper and lower portions and four connected lateral faces and installed on a bus roof to shield from view the equipment mounted on the bus roof so that such equipment is not viewable to the outside and to provide an installation area for transportation information notification and advertising materials, the lateral faces comprising at least a front portion and lateral side portions; and
   a front light guide panel and side light guide panels for transportation information notification and advertising materials installed on a front portion and on both lateral side portions of the advertisement structure, respectively;
   a front blade gradually inclined downward as it moves to a rear side while being horizontally bent toward the rear side is formed on an upper end of the front portion to induce air flow into the advertisement structure; and
   a rear blade gradually lowered as it moves to a front side while being horizontally bent toward the front side is formed on an upper end of the rear portion to easily discharge the air inside the advertisement structure.

12. The outdoor advertisement structure according to claim 11, wherein the front portion and both the lateral side portions of the advertisement structure are configured to be inclined inwardly at a predetermined angle as it moves from the lower portion to the upper portion to minimize air resistance.

13. An outdoor advertisement structure on a bus roof, comprising:
   an advertisement structure having a rectangular shape with open upper and lower portions and four connected portions and installed on a bus roof to provide an installation area for transportation information notification and advertising materials, the four connected portions comprising at least a front portion and lateral side portions; and
   a front light guide panel and side light guide panels for transportation information notification and advertising materials installed on a front portion and on both lateral side portions of the advertisement structure, respectively,
   wherein the advertisement structure further comprises an upper plate to cover equipment mounted on the bus roof and to provide an installation area for advertising materials, and the upper plate is mounted on the top of the advertisement structure able to selectively open, partially open, or close an upside of the bus roof.

14. The outdoor advertisement structure according to claim 13,
   wherein the equipment mounted on the bus roof is a heating, ventilation and air conditioning (HVAC) system mounted on the bus roof, and the outdoor advertisement structure is configured to have a height in a range of 80 to 170 cm to be greater than a height of the HVAC system mounted on the bus roof.

15. The outdoor advertisement structure according to claim 13,
   wherein the front portion and both the lateral side portions of the advertisement structure are configured to be inclined inwardly at a predetermined angle as it moves from the lower portion to the upper portion to minimize air resistance.

16. The outdoor advertisement structure according to claim 13,
   wherein the advertisement structure has an installation hole formed on the front portion to install the front light guide panel, a plurality of installation holes formed on both the lateral side portions to install the lateral light guide panels, and a plurality of penetration holes formed on a rear portion to discharge air and rainwater.

17. The outdoor advertisement structure according to claim 16, wherein the plurality of installation holes are configured to be fore-and-aft symmetrical in a rectangular shape having a horizontal width greater than a vertical width.

* * * * *